3,265,682
PEPTIDE COMPOUNDS
Urs Gloor, Riehen, Peter Quitt, Basel, Rolf Studer, Neuallschwil, and Karl Vogler, Riehen, Switzerland, assignors to Hoffmann-La Roche Inc., Nutley, N.J., a corporation of New Jersey
No Drawing. Filed May 29, 1962, Ser. No. 198,455
Claims priority, application Switzerland, June 1, 1961, 6,366/61; Dec. 1, 1961, 13,988/61
15 Claims. (Cl. 260—112.5)

This invention relates to novel peptide derivatives, their use, and intermediates in their manufacture. More particularly, the novel peptide compounds of the invention are selected from the group consisting of compounds of the formula:

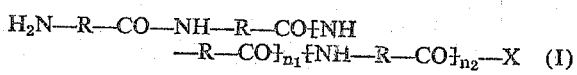

$$H_2N-R-CO-NH-R-CO\{NH-R-CO\}_{n_1}\{NH-R-CO\}_{n_2}-X \quad (I)$$

and acid addition salts thereof; wherein $n_1$ and $n_2$ are each a whole integer from 0 to 1; X is selected from the group consisting of hydroxy, alkoxy, amino, alkylamino, dialkylamino, and hydrazino; each R is the residue of an α-amino acid devoid of its α-amino and carboxyl group, at least one R being the residue of a diamino-carboxylic acid; and the molecule contains at least one long-chain aliphatic group selected from the group consisting of a long-chain aliphatic acyl substituent on an amino acid-component amino group not partaking in a peptide linkage and a long-chain aliphatic substituent comprehended by X when X is selected from the group consisting of alkylamino and dialkylamino.

The compounds of Formula I above are dipeptides, tripeptides, or tetrapeptides, derived from α-amino carboxylic acids such as serine, phenylalanine, tyrosine, leucine, lysine, arginine, ornithine, α,γ-diaminobutyric acid and α,β-diaminopropionic acid, and the like, linked in α-amide fashion. Especially preferred as building component α-amino carboxylic acids are diamino-carboxylic acids such as lysine and the basic acids named thereafter in the foregoing exemplary listing. Thus, where R in Formula I above is the residue of a diaminocarboxylic acid it can be represented by the formula:

wherein $R_1$ is selected from the group consisting of lower alkylene (preferably methylene, dimethylene, trimethylene or tetramethylene) and

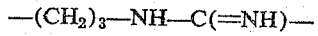

$$-(CH_2)_3-NH-C(=NH)-$$

When $R_1$ is the latter group, R of course is the residue of arginine. Also preferred as α-amino acid components are optically active amino acids such as L-lysine, the preferred optical form being the L-form. Compounds of Formula I are especially preferred wherein $n_1$ and $n_2$ are each 0, that is the dipeptide compounds are preferred. One preferred group of compounds of Formula I above are those wherein X is lower alkoxy such as methoxy, ethoxy or the like and the long-chain aliphatic acyl group contains at least 10 carbon atoms such as a higher fatty acid moiety as palmitoyl, stearoyl, or the like. Another preferred group of compounds of Formula I above are those wherein X is alkylamino or dialkylamino and at least one of the amido N-alkyl substituents is of at least 10 carbon atoms such as cetyl, lauryl, or the like. A narrower preferred embodiment consists of compounds of Formula I wherein the long-chain aliphatic group contains 12 or more carbon atoms. The term aliphatic as used herein includes both straight, e.g. palmitoyl, and branched, e.g. phytanoyl, chain alkyl moieties, as well as saturated, e.g. pentadecanoyl, and unsaturated, e.g. undecanoyl, alkyl. Preferred long-chain aliphatic groups contain not over 20 carbon atoms. It will be appreciated that in the above denotations of carbon atom content of the long-chain aliphatic moiety, the number of carbon atoms with respect to a long-chain aliphatic acyl moiety includes the carbon atom partaking in the carbonyl group. For example, palmitoyl contains 16 carbon atoms. Especially preferred long-chain aliphatic groups are those having from 14 to 18 carbon atoms.

In Formula I above, the consecutive R-symbols can represent residues derived from the same or different α-amino carboxylic acids. This will be apparent from the following exemplary list of preferred compounds: [$N^α$-palmitoyl-L-lysyl]-L-lysine, L-lysyl-[$N^ε$-palmitoyl-L-lysine], [$N^α$-palmitoyl-L-(α,γ-diaminobutyryl-L-(α,γ-diaminobutyric acid), L-(α,γ-diaminobutyryl)-L-[$N^γ$-palmitoyl-L-(α,γ-diaminobutyric acid], ($N^α$-palmitoyl-L-ornithyl)-L-arginine ($N^α$-palmitoyl-L-ornithyl)-L-ornithine ($N^α$-palmitoyl-L-arginyl)-L-arginine and their esters (especially their lower alkyl esters, such as their methyl and ethyl esters), amides and hydrazides. The compounds of Formula I above form acid addition salts, e.g. non-toxic acid addition salts, with both inorganic and organic acids, such as hydrohalic acids, phosphoric acid, nitric acid, acetic acid, formic acid, and the like.

The compounds of Formula I above and acid addition salts thereof can be prepared in accord with processes which are known per se in peptide chemistry. Thus, for example, they can be built up from the appropriate α-amino carboxylic acids or appropriate protected peptides with the use of condensing agents, or via mixed anhydrides, azides, activated esters, or acid chlorides, the terminal carboxyl function of which can, if desired, be hydrolyzed to the free hydroxyl group or be converted into an amido, N-alkylamido, N,N-dialkylamido or hydrazido group. The protecting groups can be removed and the resulting peptide compounds, if desired, converted into their salts and a long-chain acyl group introduced by interchange with a protecting group which can be selectively split off.

According to one method, compounds of the formula:

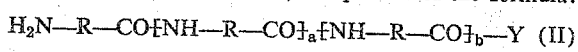

$$H_2N-R-CO\{NH-R-CO\}_a\{NH-R-CO\}_b-Y \quad (II)$$

can be reacted with a compound of the formula:

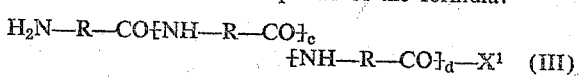

$$H_2N-R-CO\{NH-R-CO\}_c\{NH-R-CO\}_d-X^1 \quad (III)$$

wherein $a$, $b$, $c$, and $d$ are each a whole integer from 0 to 1 and the total of $a$, $b$, $c$, and $d$ is a whole integer from 0 to 2; Y is selected from the group consisting of halogen, hydroxy, azide, phenoxy, nitrophenoxy, phenylmercapto and the residue of an anhydride with an inorganic or organic acid; $X^1$ is selected from the group consisting of alkoxy, amino, alkylamino, dialkylamino, and hydroxy in the form of a salt with an inorganic or tertiary organic base, each R has the same meaning as in Formula I above; and all amino groups, with the exception of the one terminating the chain of Formula III, are protected by removable protecting groups and/or long-chain acyl groups.

The reaction between the compounds of Formulae II and III above comprises a condensation together with a splitting off of the compound H—Y so as to form a dipeptide, tripeptide, or tetrapeptide of the formula:

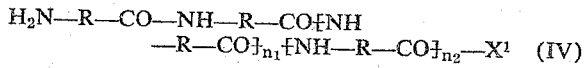

wherein $n_1$, $n_2$, each R and X have the same meaning as above, and in which all amino groups are protected in the manner indicated with respect to Formulae II and III above.

Those peptides of Formula IV which neither contain a long-chain N-acyl group nor in the terminal $COX^1$ group a long-chain alkyl substituent are then converted into corresponding peptides substituted by long-chain N-acyl or N-alkyl groups by interchange of at least one selectively removable protecting group for a long-chain acyl group, or by introduction of a long-chain N-alkyl substituent into the terminal carboxyl function. The removable protecting groups can be split off from the resulting long-chain aliphatic substituted peptide and, in the case of the long-chain acyl substituted peptide, the peptide product, prior to the splitting off, can, if necessary, be converted into its hydrazide. Finally, if desired, the peptide products can be converted into their acid addition salts.

As usual in peptide chemistry, the reaction groups which do not take part in the formation of the peptide are protected prior to the condensation reaction involving the splitting off of HY. Such protection is readily accomplished in the case of the carboxyl group by conversion to a corresponding ester or amide or by salt formation with an inorganic base or an organic tertiary base. Free amino groups can, for example, be protected by conversion into benzyloxycarbonylamino groups (i.e. their corresponding carbobenzoxy groups) for example, by the action of benzyloxycarbonyl chloride in a Shotten-Baumann reaction. The carbobenzoxy protecting groups can subsequently be split off by catalytic hydrogenation. Also, as far as the condensation is concerned, the long-chain N-acyl groups can themselves serve as protecting groups. The amino groups of the intermediate amino acids or peptides can also be protected via their conversion into phthalyl derivatives; for example, by heating the amino acid or peptide with phthalic acid anhydride. In this embodiment, the phthalyl protecting groups can be removed from the protected amino group after the condensation via the addition of hydrazine and treatment with hydrochloric acid. The amino groups can also be protected by formylation by reacting the intermediate amino acids or peptides with formic acid in the presence of acetic anhydride.

By having one or more of the amino groups protected by a formyl protecting group and one or more amino groups protected by a carbobenzoxy group, it is possible to selectively remove one sort of the protecting groups, since only the carbobenzoxy groups are removable by catalytic hydrogenation or by the action of a hydrobromic acid/acetic acid mixture while only the formyl groups are removed by the action of mineral acids in the cold.

It is thus possible to introduce the long-chain N-acyl substituent immediately after the condensation. Such introduction can, for example, be effected via the action of an appropriate acid chloride such as, for example, palmitoyl chloride.

The following synopses are illustrative of the methods available for preparing the compounds of this invention:

CARBODIIMIDE METHOD

This method is applicable when there is used as a starting material a compound of Formula II above in which Y is hydroxy, i.e. an amino acid, dipeptide or tripeptide bearing a terminal free carboxylic group. The method comprises effecting the condensation of a starting material of Formula II wherein Y is hydroxy with a starting material of Formula III in the presence of a condensing agent, such as a carbodiimide, e.g. dicyclohexylcarbodiimide, or carbonyldiimidazole. The condensation is advantageously carried out in a solvent at low temperature. Suitable solvents are organic solvents such as chloroform, N,N-dimethylformamide, ethyl acetate, or the like. The urea formed from the condensation agent can be removed by filtration, and the peptide product, which remains in solution, can be isolated from the filtrate.

AZIDE METHOD

This method comprehends formation of the peptide by the interaction of an acid azide (Y=$N_3$) and an amino group. The acid azide can be obtained by action of nitrous acid on the corresponding hydrazide. The reaction can suitably be conducted at low temperatures in a solvent, for example, an organic solvent such as ethyl acetate, dimethylformamide, or the like, and, if desired, in the presence of acetic acid.

ACID CHLORIDE METHOD

This method comprehends formation of the peptide by reaction of an acid chloride group (Y=Cl) with an amino group. One can conveniently couple a carbobenzoxy amino acid chloride (obtained via the action of thionyl chloride) with an amino acid ester ($X^1$=alkoxy) in the cold in the presence of a base.

METHOD UTILIZING MIXED ANHYDRIDES

This method comprehends using for the condensation a compound having as its carboxyl function (i.e. —CO—Y) a mixed anhydride residue formed with an organic or inorganic acid. Suitably, a carboxyl compound of Formula II above (Y=OH) is treated in an inert solvent (tetrahydrofuran) with a base, for example, triethylamine, the resulting salt reacted with a chlorocarbonic acid ester at a low temperature, and the resulting mixed anhydride reacted without isolation with an amino acid ester ($X^1$=alkoxy) or a sodium salt of Formula III above ($X^1$=ONa). Exemplary of the chlorocarbonic acid esters which can be employed, are the lower alkyl esters such as the methyl, ethyl or t-butyl esters of chlorocarbonic acid. The active anhydride can also be prepared using sulphur trioxide in dimethylformamide, diethylphosphorochloridite [$(C_2H_5O)_2$P—Cl], tetraethylpyrophosphate [$(C_2H_5O)_2$P—O—P$(OC_2H_5)_2$], or the like.

METHOD UTILIZING ACTIVE ESTER

This method comprehends using as a starting material of Formula II above a compound in which the carboxyl function (—COY) is a so-called active ester group such as, for example, COY=p-nitrophenyl ester. Such an active ester can be obtained from a protected amino acid and di(p-nitrophenyl)-sulphite

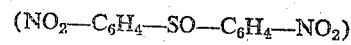

in the presence of pyridine and, on reaction at room temperature with an amino acid ester of Formula III ($X^1$=alkoxy) gives the desired peptide compound which can then be worked up by crystallization. Exemplary of suitable active ester groups are the p-nitrophenyl, 3,5-dinitrophenyl, thiophenyl, and the like ester groups.

Intermediate compounds of the formula:

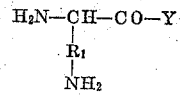

wherein $R_1$ has the same meaning as above; Y is selected from the group consisting of alkoxy (preferably lower alkoxy) and hydroxy; and at least one of the two amino groups is substituted by a long-chain acyl group of at least 10 carbon atoms and the other is protected with a removable protecting group, are novel compounds and form a part of this invention. Preferred compounds of the formula:

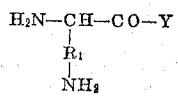

described above are $N^\alpha$-palmitoyl-$N^\gamma$-benzyloxycarbonyl-ornithine, $N^\alpha$-palmitoyl-$N^\epsilon$-benzyloylcarbonyl-L-lysine, $N^\alpha$-palmitoyl-$N^\epsilon$-benzyloxycarbonyl-D-lysine, $N^\alpha$-palmitoyl-$N^\epsilon$-benzyloxycarbonyl-DL-lysine, $N^\alpha$-stearoyl-$N^\epsilon$-benzyloxycarbonyl-L-lysine, $N^\alpha$-lauroyl-$N^\epsilon$-benzyloxycarbonyl-L-lysine, $N^\alpha$-palmitoyl-$N^\gamma$-benzyloxycarbonyl-L-$\alpha,\gamma$-diaminobutyric acid, $N^\alpha$-capryl-$N^\epsilon$-benzyloxycarbonyl-L-lysine and $N^\alpha$-(10-undecenoyl)-($N^\epsilon$-phthaloyl)-L-lysine.

Also within the scope of the invention are novel intermediates of the formula:

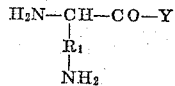

wherein at least one of the two amino groups is substituted by a long-chain acyl group of at least 10 carbon atoms; $R_1$ has the same meaning as above; and Y is selected from the group consisting of alkoxy (preferably lower alkoxy) and hydroxy. Exemplary of such compounds are $N^\epsilon$-palmitoyl-L-lysine and its lower alkyl esters and $N^\gamma$-polmitoyl-L-($\alpha,\gamma$-diaminobutyric acid) and its lower alkyl esters.

Compounds of Formula I above and their non-toxic acid addition salts are useful as preserving and disinfecting agents. They are active against gram positive and gram negative pathogenic and apathogenic bacteria, fungi, and yeasts such as *Escherichia coli*, *Pseudomonas aeruginosa*, *Proteus vulgaris*, *Staphylococcus aureus*, *Bacillus cereus*, *Bacillus subtilis*, *Streptococcus fecalis*, *Lactobacillus plantarum*, *L. acidolphilus*, *L. buchnerii*, *L. brevis*, *Saccharomyces fragilis*, *S. cerevisiae*, *Candida guilliermodii*, *Pichia farinosa* and *Pennicillum sp.* spores. These activities, in part, are illustrated by the exemplary practical applications given in the working examples below. The compounds decompose under the influence of proteolytic enzymes to give essential amino acids or very closely related compounds which no longer have any antibacterial activity. The compounds of Formula I thus do not give rise to any residue problem and are of low toxicity. Also, their good water-solubility facilitates their use. Compounds of Formula I above are suitable for preserving both solid and liquid foods. Thus, another embodiment of this invention comprehends a food composition which comprises an edible material treated with an amount sufficient to effectively preserve said edible material of a peptide compound selected from the group consisting of compounds of the formula:

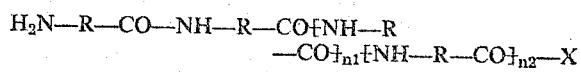

and non-toxic acid addition salts thereof; wherein $n_1$, $n_2$, each R and X have the same meaning as above. In one preferred aspect of the invention, the peptide compound used is comprised of one or more L-amino acid components. It is further preferred that the long-chain acyl or alkyl group should contain at least 10, preferably from 10 to 20, carbon atoms such as, for example, the palmitoyl or stearoyl radical. Still more preferred are those containing from 12 to 20 carbon atoms, and especially preferred are those containing from 14–18 carbon atoms. Exemplary of peptide compounds embodying these preferred aspects of the invention are $N^\alpha$-palmitoyl-L-lysyl-L-lysine, L-lysyl-$N^\epsilon$-palmitoyl-L-lysine, [$N^\alpha$-palmitoyl-L-($\alpha,\gamma$-diaminobutyryl)]-L-($\alpha,\gamma$-diaminobutyryl)-L-[$N^\gamma$-palmitoyl]-L-($\alpha,\gamma$-diaminobutyric acid), $N^\alpha$-palmitoyl-L-ornithyl]-L-arginine, [$N^\alpha$-palmitoyl-L-ornithyl]-L-ornithine, [$N^\alpha$-palmitoyl-L-orginyl]-L-arginine and esters, amides and hydrazides thereof.

It will be appreciated from the foregoing exemplary listing that diamino carboxylic acid as used herein comprehends arginine, as well as lysine and the like. In a further preferred aspect of the invention, the peptide compound used as a preservative is a dipeptide. The edible materials which may be preserved by a treatment with the peptide compounds of this invention are exemplified by both solid and liquid foods, for example, meat, meat products, fish, fish pastes, fish preserves (including those of lower pH values), sea-food (shrimps, etc.), poultry, fresh vegetables, fresh fruit (e.g. resisting the infection of citrus fruits by penecillium moulds), fruit juices, bread and bakery products and cheese, as well as animal feeds of different types. The peptide compounds of Formula I above and acid addition salts thereof also are useful as emulsifying agents.

Another aspect of the invention comprehens a process for preserving edible material which comprises treating said edible material with an amount sufficient to preserve said edible material of a peptide compound of Formula I above, or a non-toxic acid addition salt thereof. The word treating is used above in its generic sense and comprehends admixing, coating, impregnating, contacting, and the like; for example in the case of a liquid food, a composition containing the preservative peptide compound can merely be admixed with the food. In the case of a solid food, treatment can be effected, for example, by spraying the food with a solution containing the peptide compound, or by soaking the food in a solution containing the peptide compound. These methods are illustrative of direct methods of treatment. Indirect methods of treatment can also be used, for example, the food to be preserved can be packaged in a wrapping material which carries the preservative material. For example, the wrapping material can be coated or impregnated with the preservative material. The peptide preservative agents can be added as such (e.g. in powder form) or in the form of an aqueous solution, an emulsion or dispersion, or in the form of a paste or gel, to the materials to be preserved, intimately mixed therewith, and the goods to be preserved suitably sealed or packed. In certain cases, the preservative agents can be added to the wash-water (such as in preserving potatoes, onions, bulbs, strawberries). They can also be introduced into ice which is intended for keeping fish and other sea-food cold during storage. The preserving agents of this invention may be used in combination with one another or in combination with other preserving measures. Thus, by use of the new agents in association with a heat sterilization process, the duration of heating is lessened. Also, the agents can be used in association with low temperature storage. For example, for refrigerated transports, such as the transportation of citrus fruits.

In the examples, the following abbreviations are used:

| | | |
|---|---|---|
| Z | Benzyloxycarbonyl | ⌬—$CH_2OCO$— |
| Palm | Palmitoyl | $CH_3(CH_2)_{14}CO$— |
| DMF | Dimethylformamide | $(CH_3)_2N$—CHO |
| Arg | Arginyl | —HN—CH—CO—<br>$(CH_2)_3$<br>NH—C—$NH_2$<br>‖<br>NH |
| Nitroarg | Nitroarginyl | —NH—CH—CO—<br>$(CH_2)_3$<br>NH—C—$NHNO_2$<br>‖<br>NH |
| Dab | α,γ-Diaminobutyryl | —HN—CH—CO—<br>$(CH_2)_2$<br>$NH_2$ |
| Lys | Lysyl | —HN—CH—CO—<br>$(CH_2)_4$<br>$NH_2$ |
| Orn | Ornithyl | —HN—CH—CO—<br>$(CH_2)_3$<br>$NH_2$ |
| Ser | Seryl | —HN—CH—CO—<br>$CH_2OH$ |
| Leu | Leucyl | —HN—CH—CO—<br>$CH_2$<br>CH<br>/  \\<br>$CH_3$  $CH_3$ |
| Phe | Phenylalanyl | —HN—CH—CO—<br>$CH_2$<br>⌬ |
| Tyr | Tyrosyl | —HN—CH—CO—<br>$CH_2$<br>⌬<br>OH |

As illustrative of the above usage in the following examples there can be cited, for example, $N^α$-palmitoyl-($N^ε$-carbobenzoxy)-L-lysyl-($N^ε$-carbobenzoxy)-L-lysine methyl ester of the formula:

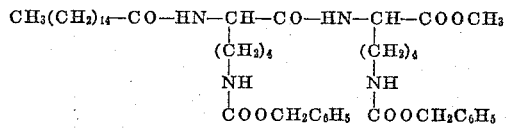

which in the following examples is shown as $N^α$-Palm-($N^ε$-Z)-L-Lys-($N^ε$-Z)-L-Lys-$OCH_3$, and L-nitroarginine ethyl ester of the formula:

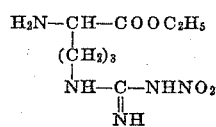

which in the following examples is shown as H-L-Nitroarg-$OC_2H_5$.

The following examples are illustrative but not limitative of the invention. All temperatures are in degrees centigrade.

*Example*

$N^α$-Palm-($N^ε$-Z)-L-Lys-($N^ε$-Z)-L-Lys-$OCH_3$: 100 g. of $N^α$-Palm-($N^εZ$)-L-Lys-OH and 57 g. of N-($N^ε$-Z)-L-Lys-$OCH_3$ were dissolved in 230 ml. of dimethylformamide, cooled to —10°, treated with 40.8 g. of dicyclohexylcarbodiimide and allowed to stand at 0° for 16 hours. The so-formed thick gel was diluted with 50 ml. of dimethylformamide, heated to 50°, cooled to 20° and filtered off with suction from the dicyclohexylurea. The filtrate was mixed with 4 liters of 5% sodium chloride solution and after one hour, the resulting precipitate filtered off with suction, washed with water and dried in vacuo at 70°. After recrystallization from ethyl acetate/petroleum ether there was obtained $N^α$-Palm-($N^ε$-Z)-L-Lys-($N^ε$-Z)-L-Lys-$OCH_3$ melting at 123–125°; $[α]_D^{20}$=—8.4° (c.=2 in DMF).

$N^α$-Palm-L-Lys-L-Lys-$OCH_3$·2HCl; 50 g. of $N^α$-Palm-($N^ε$-Z)-L-Lys-($N^ε$-Z)-L-Lys-$OCH_3$ was dissolved in 50 ml. of glacial acetic acid with warming, and shaken with the exclusion of moisture for 1½ hours at 20° with 150 ml. of 33% hydrobromic acid/glacial acetic acid. The mixture was then degasified for 15 minutes under a waterjet vacuum, diluted with 150 ml. of water and twice extracted with ether. The aqueous phase was then, with the addition of ice, made alkaline with concentrated ammonia and extracted several times with ethyl acetate. The ethyl acetate extracts were dried over sodium sulfate and concentrated in vacuo at 40°. The residual syrup was dissolved in 20 ml. of methanol and adjusted to pH 7 with 4 N methanolic hydrochloric acid and the so-formed neutral solution evaporated in vacuo at 40°. The so-obtained residue was then crystallized from acetone yielding N-Palm-L-Lys-L-Lys-$OCH_3$·2HCl melting at 210–212° (dec.); $[α]_D^{20}$=—17° (c.=2 in water).

$N^α$-Palm-($N^ε$-Z)-L-Lys-($N^ε$-Z)-L-Lys-OH: 26 g. of $N^α$-Palm-($N^ε$-Z)-L-Lys-($N^ε$-Z)-L-Lys-$OCH_3$ was dissolved in 1 liter of methanol and saponified for 16 hours at 20° with 50 ml. of 2 N sodium hydroxide. The reaction mixture was then filtered and the filtrate concentrated in vacuo at 35° to a volume of 100 ml., mixed with 1 liter of 0.01 N hydrochloric acid, filtered under suction and the precipitate washed with water and dried in vacuo at 70°. The so-obtained residue was crystallized from ethyl acetate/petroleum ether yielding $N^α$-Palm-($N^ε$-Z)-L-Lys-($N^ε$-Z)-L-Lys-OH melting at 129–131°.

$N^α$-Palm-L-Lys-L-Lys-OH.HCl: 16 g. of $N^α$-Palm-($N^ε$-Z)-L-Lys-($N^ε$-Z)-L-Lys-OH in 300 ml. of glacial acetic acid and 30 ml. of water was hydrogenated following the addition of 1 g. of palladium activated charcoal. The catalyst was then filtered off with suction, the filtrate concentrated in vacuo at 45° and the residue twice subjected to dissolution and solvent evaporation with methanol. The so-obtained residue was then taken up in a small amount of water, the pH of the so-obtained solution adjusted to 7 with 1 N hydrochloric acid, the so-obtained neutral solution filtered, mixed with acetone and again filtered, yielding, as the precipitate, $N^α$-Palm-L-Lys-L-Lys-OH.HCl which decomposed at temperatures above 180°; $[α]_D^{20}$=—4° (c.=2 in water).

*Example 2*

$N^α$-Palm-($N^ε$-Z)-L-Lys-($N^ε$-Z)-L-Lys-$NH_2$: 20 g. of $N^α$-Palm-($N^ε$-Z)-L-Lys-($N^ε$-Z)-L-Lys-$OCH_3$ in 800 ml. of methanol was saturated with ammonia gas at 25° and permitted to stand at 25° for 48 hours. The precipitate was filtered off with suction, washed with a large volume of water, dried in vacuo at 60° and crystallized from dimethylformamide/water yielding $N^α$-Palm-($N^ε$-Z) - L - Lys-($N^ε$-Z)-L-Lys-$NH_2$ melting at 174–176°; $[α]_D^{20}$=—8.2° (c.=2 in dimethylformamide).

$N^\alpha$-Palm-L-Lys-L-Lys-$NH_2$.2HCl: 17 g. of $N^\alpha$-Palm-($N^\epsilon$-Z)-L-Lys-($N^\epsilon$-Z)-L-Lys-$NH_2$ in 300 ml. of glacial acetic acid and 30 ml. of water was hydrogenated in the presence of 1.7 g. of palladium activated charcoal. The catalyst was then filtered off with suction and the filtrate concentrated in vacuo at 45°. After twice dissolving the residue in water followed by subsequent evaporation, the resulting residue was again dissolved in a small amount of water and the so-obtained solution adjusted to a pH of 7 with 3 N hydrochloric acid and the neutral solution then mixed with acetone yielding as the precipitate, $N^\alpha$-Palm-L-Lys-L-Lys-$NH_2$.2HCl melting at 232–233° (dec.); $[\alpha]_D^{20} = -11°$ (c.=2 in water).

Me=methanol
Et=ethanol
Aq=water
Ac=acetone
E=ethyl acetate
P=petroleum ether
DMF=dimethylformamide
F=melting point
Aet=ether

|   |   | F:° C. | $[\alpha]_D^{23}$ |
|---|---|---|---|
| a | $N^\alpha$-Palm-($N^\epsilon$-Z)-L-Lys-($N^\epsilon$-Z)-L-Lys-$OC_2H_5$<br>$N^\alpha$-Palm-L-Lys-L-Lys-$OC_2H_5$.2HCl | 110–113 (Et/Aq)<br>242–246 (Et) | −23° (c=3, Aq). |
| b | $N^\alpha$-Palm-L-Lys-L-Lys-$OC_2H_5$.2$H_3PO_4$ | 165 (Ac/Aq) | −20° (c=3, Aq). |
| c | $N^\alpha$-Palm-($N^\epsilon$-Z)-D-Lys-($N^\epsilon$-Z)-D-Lys-$OC_2H_5$<br>$N^\alpha$-Palm-D-Lys-D-Lys-$OC_2H_5$.2HCl | 110–113 (Et)<br>242–246 (Et) | +23° (c=3, Aq). |
| d | $N^\alpha$-Palm-($N^\epsilon$-Z)-DL-Lys-($N^\epsilon$-Z)-DL-Lys-$OC_2H_5$<br>$N^\alpha$-Palm-DL-Lys-DL-Lys-$OC_2H_5$.2HCl | 93–109 (Et)<br>210–220 (Et) |   |
| e | $N^\alpha$-Stearoyl-($N^\epsilon$-Z)-L-Lys-($N^\epsilon$-Z)-L-Lys-$OC_2H_5$<br>$N^\alpha$-Stearoyl-L-Lys-L-Lys-$OC_2H_5$.2HCl | 105–108 (Et/Aq)<br>235–240 (Et) | −21° (c=3, Aq). |
| f | $N^\alpha$-Palm-($N^\delta$-Z)-L-Orn-($N^\delta$-Z)-L-Orn-$OCH_3$<br>$N^\alpha$-Palm-L-Orn-L-Orn-$OCH_3$.2HCl | 121–124 (E)<br>230–233 (Me/Ac) | −1.9° (c=1, DMF).<br>−12.2° (c=2, Me). |
| g | $N^\alpha$-Palm-($N^\delta$-Z)-L-Orn-L-Nitroarg-$OCH_3$<br>$N^\alpha$-Palm-L-Orn-L-Arg-$OCH_3$.2HCl | 135–139 (E)<br>217–220 (Me/Ac) | −2.5° (c=1, DMF).<br>−5.2° (c=2, Me). |
| h | $N^\alpha$-Lauroyl-($N^\epsilon$-Z)-L-Lys-($N^\epsilon$-Z)-L-Lys-$OCH_3$<br>$N^\alpha$-Lauroyl-L-Lys-L-Lys-$OCH_3$.2HCl | 137–139 (Me/Ac)<br>212–214 (Me/Ac) | −11.6° (c=2, Me).<br>−20.0° (c=2, Me). |
| i | $N^\alpha$-Palm-($N^\gamma$-Z)-L-Dab-($N^\gamma$-Z)-L-Dab-$OCH_3$<br>$N^\alpha$-Palm-($N^\gamma$-Z)-L-Dab-($N^\gamma$-Z)-L-Dab-$NHNH_2$<br>$N^\alpha$-Palm-L-Dab-L-Dab-$NHNH_2$.2HCl | 119–121 (E/P)<br>183–184 (DMF/Ac)<br>184 (Me/Et) | −13.8° (c=2, DMF). |
| k | $N^\alpha,N^\epsilon$-Di-Z-L-Lys-($N^\epsilon$-Palm)-L-Lys-$OCH_3$<br>H-L-Lys-($N^\epsilon$-Palm)-L-Lys-$OCH_3$.2HCl | 151–153 (Me/Aq)<br>170 (Me/Et) |   |
| l | $N^\alpha,N^\epsilon$-Di-Z-L-Lys-($N^\epsilon$-Palm)-L-Lys-$NHNH_2$<br>H-L-Lys-($N^\epsilon$-Palm)-L-Lys-$NHNH_2$.HBr | 178–180 (Aq)<br>194–195 (Et/Aet) |   |
| m | $N^\alpha$-Capryl-($N^\epsilon$-Z)-L-Lys-($N^\epsilon$-Z)-L-Lys-$OCH_3$<br>$N^\alpha$-Capryl-L-Lys-L-Lys-$OCH_3$.2HCl | 130–132 (Me/Aet)<br>206–211 (Me/Aet) | −11.5° (c=2, Me).<br>−19.9° (c=2, Me). |
| n | $N^\alpha$-Palm-($N^\epsilon$-Z)-L-Lys-L-Ser-$OCH_3$<br>$N^\alpha$-Palm-L-Lys-L-Ser-$OCH_3$.2HCl | 125–127 (Me)<br>139 (Aq/Ac) | −8.2° (c=2, Aq). |
| o | $N^\alpha$-Palm-($N^\epsilon$-Z)-L-Lys-L-Leu-$OCH_3$<br>$N^\alpha$-Palm-L-Lys-L-Leu-$OCH_3$ | 86–88 (E)<br>181–185 (Aq) | −13.6° (c=2, DMF).<br>−33.2° (c=1, Aq). |
| p | $N^\alpha$-Palm-($N^\epsilon$-Z)-L-Lys-L-Tyr-$OCH_3$<br>$N^\alpha$-Palm-L-Lys-L-Tyr-$OCH_3$ | 105–108 (E)<br>159–161 (Me/E) | −1° (c=2, DMF).<br>−42.6° (c=1, Aq). |

Example 3

$N^\alpha$-Palm-($N^\epsilon$-Z)-L-Lys-($N^\epsilon$-Z)-L-Lys-$NHNH_2$: 26 g. of $N^\alpha$-Palm-($N^\epsilon$-Z)-L-Lys-($N^\epsilon$-Z)-L-Lys-$OCH_3$ in 400 ml. of methanol was treated with 26 ml. of 100% hydrazine hydrate and heated on the steam bath for 15 minutes. After standing for a further 24 hours, it was mixed with 800 ml. of water and filtered with suction. The precipitate was washed with a large amount of water and dried. Upon crystallization from dimethylformamide/ethanol, there was obtained $N^\alpha$-Palm-($N^\epsilon$-Z)-L-Lys-($N^\epsilon$-Z)-L-Lys-$NHNH_2$ melting at 190–191°; $[\alpha]_D^{20} = -10.3°$ (c.=1 in dimethylformamide).

$N^\alpha$-Palm-L-Lys-L-Lys-$NHNH_2$.3HBr: A solution of 22 g. of $N^\alpha$-Palm-($N^\epsilon$-Z)-L-Lys-($N^\epsilon$-Z)-L-Lys-$NHNH_2$ in 100 ml. of glacial acetic acid was shaken for 1½ hours with the exclusion of moisture with 110 ml. of 33% hydrogen bromide/glacial acetic acid. The reaction product was crystallized from the mixture via the addition of 500 ml. of absolute ether, the precipitate filtered off with suction, washed with a large volume of absolute ether and recrystallized from ethanol/ether yielding $N^\alpha$-Palm-L-Lys-L-Lys-$NHNH_2$.3HBr which exhibited an optical rotation of $[\alpha]_D^{20} = -14.8°$ (c.=1 in water).

Example 4

According to the above described procedures the dipeptides listed in the following table were prepared. In the table the following abbreviations are used.

Example 5

$N^\alpha$-Z-L-Nitroarg-L-Nitroarg-$OC_2H_5$: 35.3 g. of $N^\alpha$-Z-L-Nitroarg-OH [Z. physiol. Chem. 224, 40 (1934)] was dissolved in 400 ml. of absolute tetrahydrofuran and with stirring at −10° treated with 16.2 g. of carbonyldiimidazole. After being stirred for a further 40 minutes a solution of H-L-Nitroarg-$OC_2H_5$ (prepared from about 0.2 mole of the oily hydrochloride with the aid of triethylamine) in 150 ml. of dimethylformamide was added thereto, and the mixture then stirred for a further 4 hours at 0°. After evaporation of the solvent in vacuo, the residue was taken up in 1 N hydrochloric acid whereupon an oil separated out which was triturated several times with water whereby it finally solidified. Upon recrystallization from ethanol/water, it yielded $N^\alpha$-Z-L-Nitroarg-L-Nitroarg-$OC_2H_5$ melting at 123–125°; $[\alpha]_D^{21} = -7.8°$ (c.=1.0 in alcohol).

$N^\alpha$-Palm-L-Nitroarg-L-Nitroarg-$OC_2H_5$: 14.6 of $N^\alpha$-Z-L-Nitroarg-L-Nitroarg-$OC_2H_5$ was decarbobenzoxylated by treatment for one hour with 50 ml. of 25% hydrobromic acid in glacial acetic acid. The hydrobromide was precipitated in ether, washed several times with ether and twice subjected to dissolution in ethanol followed by subsequent evaporation in vacuo. The residue was reacted in absolute ethanol with excess triethylamine and evaporated in vacuo. The residue was then taken up in 150 ml. of absolute pyridine, 4 ml. of triethylamine added thereto and at between −10 and −15° with vigorous stirring, 7.2 g. of palmitoyl chloride was then added thereto dropwise. The mixture was then stirred at 0° for a further 30 minutes, and then the solvents evaporated off in vacuo. The residue was partitioned between ethyl acetate and 3 N hydrochloric acid, washed rapidly with water and saturated sodium chloride solution, dried over sodium sulfate and concentrated in vacuo yielding $N^\alpha$-Palm-L-Nitroarg-L-Nitroarg-$OC_2H_5$ melting at 169–173° (following recrystallization from ethanol/ether).

solution was then dried over sodium sulfate and concentrated in vacuo. By this method the following $N^\alpha$-acylated dipeptide esters were obtained. The abbreviations used are the same as those used in the table of Example 4.

|   |   | F.: ° C. | $[\alpha]_D^{23}$ |
|---|---|---|---|
| a | $N^\alpha$-Tridecanoyl-($N^\epsilon$-Z)-L-Lys-($N^\epsilon$-Z)-L-Lys-$OCH_3$ | 135–137 (Me/Aq) | –13.7° (c=2,Me). |
|   | $N^\alpha$-Tridecanoyl-L-Lys-L-Lys-$OCH_3$.2HCl | 215–219 (Me/Act) | –18.5° (c=2,Me). |
| b | $N^\alpha$-Myristoyl-($N^\epsilon$-Z)-L-Lys-($N^\epsilon$-Z)-L-Lys-$OCH_3$ | 128–132 (E/P) | –11.1° (c=2,Me). |
|   | $N^\alpha$-Myristoyl-L-Lys-L-Lys-$OCH_3$.2HCl | 214–240 (Me/Act) | –19.1° (c=2,Me). |
| c | $N^\alpha$-Pentadecanoyl-($N^\epsilon$-Z)-L-Lys-($N^\epsilon$-Z)-L-Lys-$OCH_3$ | 129–130 (Me/Aq) | –11.7° (c=2,Me). |
|   | $N^\alpha$-Pentadecanoyl-L-Lys-L-Lys-$OCH_3$.2HCl | 209–215 (Me/Act) | –19.4° (c=2,Me). |
| d | $N^\alpha$-Margaroyl-($N^\epsilon$-Z)-L-Lys-($N^\epsilon$-Z)-L-Lys-$OCH_3$ | 130–132 (Me/Aq) | –11.8° (c=2,Me). |
|   | $N^\alpha$-Margaroyl-L-Lys-L-Lys-$OCH_3$.2HCl | 216–220 (Me/Act) | –16.5° (c=2,Me). |
| e | $N^\alpha$-Arachidoyl-($N^\epsilon$-Z)-L-Lys-($N^\epsilon$-Z)-L-Lys-$OCH_3$ | 120–123 (E/P) |   |
|   | $N^\alpha$-Arachidoyl-L-Lys-L-Lys-$OCH_3$.2HCl | 220–225 (Me) | –16.5° (c=2,Me). |
| f | $N^\alpha$-Phytanoyl-($N^\epsilon$-Z)-L-Lys-($N^\epsilon$-Z)-L-Lys-$OCH_3$ | 115–118 (E/P) | –12.9° (c=2,Me). |
|   | $N^\alpha$-Phytanoyl-L-Lys-L-Lys-$OCH_3$.2HCl | 215–219 (Me/Act) | –19.5° (c=2,Me). |

$N^\alpha$-Palm-L-Arg-L-Arg-$OC_2H_5$.2HCl: $N^\alpha$ - Palm - L-Nitroarg-L-Nitroarg-$OC_2H_5$ was dissolved in a 50-fold amount of glacial acetic acid and hydrogenated for 24 hours at room temperature following the addition of 10% water and 5% palladium activated charcoal catalyst. The catalyst was then filtered off, the filtrate concentrated in vacuo and the residue crystallized from methanol yielding $N^\alpha$ - Palm-L-Arg-L-Arg-$OC_2H_5$.2HCl melting at 225–230°; $[\alpha]_D^{21}$=–13.7° (c.=2 in ethanol).

*Example 6*

$N^\alpha$-Formyl-($N^\epsilon$-Z)-L-Lys-($N^\epsilon$-Z)-L-Lys-$OCH_3$: 26.3 g. of $N^\alpha$-Formyl-($N^\epsilon$-Z)-L-Lys-OH [J. Amer. Chem. Soc., 82, 3727 (1960)] was dissolved in 150 ml. of absolute tetrahydrofuran and treated with stirring at –10° with 13.8 g. of carbonyl-diimidazole. After 30 minutes a solution of H-($N^\epsilon$-Z)-L-Lys-$OCH_3$ (obtained from 28 g. of the hydrochloride by treatment with triethylamine) in 50 ml. of tetrahydrofuran was added thereto, and the mixture then stirred for 4 hours at room temperature. It was then concentrated in vacuo, taken up in ethyl acetate and washed with ice cold 1 M tartaric acid, ice water, 10% potassium bicarbonate and saturated sodium chloride solution. At this point, sufficient tetrahydrofuran was added to dissolve any precipitates which appeared. If no precipitate appeared, the addition of tetrahydrofuran was omitted. The solution was then dried over sodium sulfate and concentrated in vacuo. The residue was crystallized from acetone/ether yielding $N^\alpha$-Formyl-($N^\epsilon$-Z)-L-Lys-($N^\epsilon$-Z)-L-Lys-$OCH_3$ melting at 147–149°; $[\alpha]_D^{22}$=–16.9° (c.=1.0 in methanol).

Deformylation and reaction with fatty acid chlorides: 29 g. of $N^\alpha$-Formyl-($N^\epsilon$-Z)-L-Lys-($N^\epsilon$-Z)-L-Lys-$OCH_3$ was shaken for 5 hours with 100 ml. of 2 N methanolic hydrochloric acid and 70 ml. of methanol, yielding a clear solution which was then evaporated in vacuo. The residue was triturated several times with ether and was twice subjected to dissolution and subsequent evaporation in vacuo, each time with 100 ml. of toluene. The residue was then taken up with 300 ml. of absolute tetrahydrofuran and while cooling with ice treated with 10 ml. of triethylamine, then filtered and after addition with good stirring of a further 10 ml. of triethylamine, treated with 50 mmole of a higher fatty acid chloride in such a manner so that the temperature did not exceed –10°. The reaction mixture was then stirred for a further 20 minutes at 0° and concentrated to ½ its original volume in vacuo. The residue was then partitioned between ethyl/acetate and hydrochloric acid, washed with hydrochloric acid, water and concentrated sodium chloride solution during which in order to prevent the formation of a precipitate some methanol was added from time to time, or the mixture was subjected to slight heating. The

*Example 7*

$N^\alpha$-Palm-($N^\epsilon$-Z)-L-Lys-($N^\epsilon$-Z)-L-Lys-($N^\epsilon$-Z) - L - Lys-$OCH_3$: The above was prepared from $N^\alpha$-Palm-($N^\epsilon$-Z)-L-Lys-($N^\epsilon$-Z)-L-Lys-OH and H-($N^\epsilon$-Z)-L-Lys-$OCH_3$ with dicyclohexylcarbodiimide. Upon crystallization from ethyl acetate/ether it melted at 148–150°.

$N^\alpha$-Palm-($N^\epsilon$-Z)-L-Lys-($N^\epsilon$-Z)-L-Lys-($N^\epsilon$-Z) - L - Lys-$NHNH_2$: The above was prepared from $N^\alpha$-Palm-($N^\epsilon$-Z)-L-Lys-($N^\epsilon$-Z)-L-Lys-($N^\epsilon$-Z)-L-Lys-$OCH_3$ using hydrazine hydrate as in the method set forth in Example 3. Upon crystallization from dimethylformamide/ethanol, it melted at 192–194°; $[\alpha]_D^{20}$=–9.0° (c.=1, dimethylformamide).

$N^\alpha$-Palm-L-Lys-L-Lys-L-Lys$NHNH_2$.4HBr: The above was prepared from $N^\alpha$-Palm-($N^\epsilon$-Z)-L-Lys-($N^\epsilon$-Z)-L-Lys-($N^\epsilon$-Z)-L-Lys-$NHNH_2$ using hydrogen bromide/glacial acetic acid; $[\alpha]_D^{20}$=–18.5° (c.=1, $H_2O$).

*Example 8*

$N^\alpha$-formyl-($N^\gamma$-Z)-D-Dab-($N^\gamma$-Palm)-L - Dab - $OHC_3$: The above was prepared from H-($N^\gamma$-Palm)-L-Dab-$OCH_3$.HCl and $N^\alpha$-formyl-($N^\gamma$-Z)-D-Dab-OH using dicyclohexylcarbodiimide in dimethylformamide in accordance with the method set forth in Example 1 above. Upon crystallization from ethyl acetate it melted at 164–166°.

$N^\alpha$-formyl-($N^\gamma$-Z)-D-Dab-($N^\gamma$-Palm)-L-Dab - $NHNH_2$: The above was prepared from above-mentioned ester by using hydrazine hydrate according to the method of Example 3. Upon crystallization from methanol, it melted at 204–206°.

H-D-Dab-($N^\gamma$-Palm)-L-Dab-$NHNH_2$.2HBr: 10 g. of $N^\alpha$-formyl-($N^\gamma$-Z)-D-Dab-($N^\gamma$-Palm)-L-Dab-$NHNH_2$ was covered with 120 ml. of 33% hydrogen bromide/glacial acetic acid and with the exclusion of moisture shaken for 2 hours. The so-formed emulsion was treated with 500 ml. of absolute ether and the precipitated product permitted to stand for 2 hours in 50 ml. of water at 20° in order to effect deformylation. The end product was then isolated by lyophilisation and recrystallized from methanol/ethyl acetate. It melted at 215–218° (dec.).

*Example 9*

$N^\alpha$-Z-($N^\gamma$-Z)-D-Dab-($N^\gamma$-Z)-D - Dab - ($N^\gamma$ - Palm) - L-Dab-$OCH_3$: 8.4 g. of H-($N^\gamma$-Palm)-L-Dab-$OCH_3$.HCl was dissolved in 80 ml. of dimethylformamide and vigorously stirred for 15 minutes with 3.2 ml. of triethylamine. The mixture was then filtered with suction and 13 g. of $N^\alpha$-Z-($N^\gamma$-Z)-D-Dab-($N^\gamma$-Z)-D-Dab-OH dissolved in the filtrate, and the so-formed mixture then treated at 0° with 4.3 g. of dicyclohexylcarbodiimide. After 24 hours, the dicyclohexylurea which had been formed was filtered off with suction, and the filtrate treated with 20 g. of sodium chloride in 1 liter of 0.1 N hydrochloric acid. The resulting mixture was then filtered with suction, the precipitate mixed with dimethylformamide with 0.1 N ammonia and reprecipitated with the addition of sodium chloride. The precipitate was dried in vacuo at 70° and crystallized from methanol, yielding $N^\alpha$-Z-($N^\gamma$-Z)-D-Dab-($N^\gamma$-Z)-D-Dab-($N^\gamma$-Palm)-L-Dab-OCH$_3$ melting at 178–180°.

$N^\alpha$-Z-($N^\gamma$-Z)-D-Dab-($N^\gamma$-Z)-D-Dab-($N^\gamma$-Palm)-L-Dab-NHNH$_2$: 14 g. of $N^\alpha$-Z-($N^\gamma$-Z)-D-Dab-($N^\gamma$-Z)-D-Dab-($N^\gamma$-Palm)-L-Dab-OCH$_3$ was dissolved in 100 ml. of dimethylformamide and 14 ml. of 100% hydrazine hydrate with warming, and then allowed to stand for 24 hours at 20°. It was then triturated with 200 ml. of ethanol, filtered with suction and the precipitate washed with ethanol and dried, yielding $N^\alpha$-Z-($N^\gamma$-Z)-D-Dab-($N^\gamma$-Z)-D-Dab-($N^\gamma$-Palm)-L-Dab-NHNH$_2$ melting at 222–224°.

H-D-Dab-D-Dab-($N^\gamma$-Palm)-L-Dab-NHNH$_2$.3HBr: 10 g. of $N^\alpha$-Z-($N^\gamma$-Z)-D-Dab-($N^\gamma$-Z)-D-Dab-($N^\gamma$-Palm)-L-Dab-NHNH$_2$ was covered with 75 ml. of 33% hydrogen bromide/glacial acetic acid and shaken for 2 hours with the exclusion of moisture. The suspension was then mixed with 300 ml. of absolute ether, the supernatant mother-liquor decanted off and the residue washed several times with fresh absolute ether. It was then recrystallized from methanol/ether yielding H-D-Dab-D-Dab-($N^\gamma$-Palm)-L-Dab-NHNH$_2$.3HBr which showed a rotation of $[\alpha]_D^{20}=-7.8°$ (c.=1 in water).

Example 10

$N^\alpha$-formyl-($N^\gamma$-Z)-L-Dab-($N^\gamma$-Z)-D-Dab-($N^\gamma$-Z)-D-Dab-($N^\gamma$-Palm)-L-Dab-OCH$_3$: 9.1 g. of $N^\alpha$-formyl-($N^\gamma$-Z)-L-Dab-($N^\gamma$-Z)-D-Dab-NHNH$_2$ was dissolved with vigorous stirring at 0° in 100 ml. of glacial acetic acid, 50 ml. of water, 100 ml. of ethyl acetate and 12.7 ml. of 3 N hydrochloric acid. A solution of 1.32 g. of sodium nitrite in 15 ml. of water was then slowly added thereto in a dropwise manner at −10°. Following 15 minutes the mixture was extracted with ethyl acetate at 0°, washed with water and 1 N sodium bicarbonate, and the solution dried over sodium sulfate at 0°. The so-obtained azide solution was then treated with a solution of 11 g. of H-($N^\gamma$-Z)-D-Dab-($N^\gamma$-Palm)-L-Dab-OCH$_3$ in 65 ml. of dimethylformamide, the resulting mixture permitted to stand at 0° for 20 hours and then at 20° for 6 hours, after which it was concentrated in vacuo and mixed with 400 ml. of ether yielding as a precipitate, $N^\alpha$-formyl-($N^\gamma$-Z)-L-Dab-($N^\gamma$-Z)-D-Dab-($N^\gamma$-Z)-D-Dab-($N^\gamma$-Palm)-L-Dab-OCH$_3$ which, after being filtered off with suction, washed with ether and dried in vacuo at 60°, melted at 222–224°.

$N^\alpha$-formyl-($N^\gamma$-Z)-L-Dab-($N^\gamma$-Z)-D-Dab-($N^\gamma$-Z)-D-Dab-($N^\gamma$-Palm)-L-Dab-NHNH$_2$: 11 g. of $N^\alpha$-formyl-($N^\gamma$-Z)-L-Dab-($N^\gamma$-Z)-D-Dab-($N^\gamma$-Z)-D-Dab-($N^\gamma$-Palm)-L-Dab-OCH$_3$ was dissolved in 90 ml. of dimethylformamide and 11 ml. of 100% hydrazine hydrate with warming. After 20 hours, the solution was mixed with 200 ml. of water, filtered with suction and the precipitate washed with water and dried in vacuo at 80°, yielding $N^\alpha$-formyl-($N^\gamma$-Z)-L-Dab-($N^\gamma$-Z)-D-Dab-($N^\gamma$-Z)-D-Dab-($N^\gamma$-Palm)-L-Dab-NHNH$_2$ melting at 240–242°.

H-L-Dab-D-Dab-D-Dab-($N^\gamma$-Palm)-L-Dab-NHNH$_2$.4HBr: 8 g. of $N^\alpha$-formyl-($N^\gamma$-Z)-L-Dab-($N^\gamma$-Z)-D-Dab-($N^\gamma$-Z)-D-Dab-($N^\gamma$-Palm)-L-Dab-NHNH$_2$ was covered with 80 ml. of 33% hydrogen bromide/glacial acetic acid and shaken for 2 hours with the exclusion of water. The resulting suspension was mixed with 300 ml. of absolute ether and the supernatant mother-liquor filtered off with suction. The residue was treated several times with fresh ether and then taken up in 80 ml. of water. Any remaining ether was removed by evacuation, and the mixture then permitted to stand for 2 hours at 20°. The aqueous solution was then lyophilised and the residue recrystallized from methanol/ether. It was then dissolved in methanol, neutralized with pyridine to a pH of 7, and the solution precipitated out in alcohol. After drying, the precipitate was dissolved in 50 ml. of water and lyophilised yielding the above tetrahydrobromide in the form of a colorless powder melting at 245–250° (dec.).

Example 11

$N^\alpha$-(10-undecenoyl)-L-Lys-L-Lys-OC$_2$H$_5$.2HCl: 28 g. of H-($N^\epsilon$-phthaloyl)-L-Lys-OC$_2$H$_5$.HCl was dissolved in 150 ml. of dimethylformamide by slight warming. After cooling, it was treated with 12 ml. of triethylamine and from triethylamine hydrochloride filtered off with suction. 35 g. of $N^\alpha$-(10-undecenoyl)-($N^\epsilon$-phthaloyl)-L-Lys-OH was then added to the filtrate and dissolved by slight warming. The reaction mixture was then cooled to between 0 and −5° and 17.5 g. of dicyclohexylcarbodiimide in 80 ml. of dimethylformamide added thereto. The resulting mixture was then placed in a refrigerator. After 24 hours the urea formed was filtered off, the solution mixed with ice water, the precipitated protected dipeptide dissolved in ethyl acetate, washed with 1 N sodium bicarbonate, 0.1 N hydrochloric acid and water. After evaporation, the residue was recrystallized from ethanol/water yielding $N^\alpha$-(10-undecenoyl)-($N^\epsilon$-phthaloyl)-L-Lys-($N^\epsilon$-phthaloyl)-L-Lys-OC$_2$H$_5$ melting at 130–132°; $[\alpha]_D^{21}=-7.4°$ (c.=2.54 in ethanol).

In order to split off the protecting groups, 7.3 g. of the above described dipeptide was heated under reflux for 1 hour in 100 ml. of ethanol and 3 ml. of water with the addition of 1 g. of hydrazine hydrate. After standing for some time at room temperature, it was treated with 2 ml. of concentrated hydrochloric acid, shaken thoroughly and with suction filtered free of the phthaloyl hydrazide which had been formed. Concentration of the ethanolic mother-liquor and filtration resulted in separation of still more phthaloyl hydrazide. The filtrate was then concentrated, and precipitated with acetone and petroleum ether yielding $N^\alpha$-(10-undecenoyl)-L-Lys-L-Lys-OC$_2$H$_5$.2HCl which, after being recrystallized twice from ethanol, melted at 241–243°; $[\alpha]_D^{22}=-31°±2°$ (c.=1.6 in water).

Example 12

$N^\alpha,N^\gamma$-di-Z-L-Lys-($N^\epsilon$-Z)-L-Lys-cetylamide: A solution of 35.4 g. of $N^\alpha,N^\gamma$-di-Z-L-Lys-($N^\epsilon$-Z)-L-Lys-OH (J. Chem. Soc., 1953, 475) in 150 ml. of tetrahydrofuran was treated at 2° with stirring with 8.6 g. of carbonyl-diimidazole. After 30 minutes 12.7 g. of cetylamine was added thereto, and the mixture permitted to stand overnight at room temperature. The precipitated substance was then filtered off with suction and washed, yielding 19.8 g. of product. The filtrate in turn was concentrated in vacuo taken up in ethyl acetate, washed and dried. Following evaporation and recrystallization from chloroform/petroleum ether it yielded 5.2 g. of further product. All together there was obtained 25.0 g. of $N^\alpha,N^\gamma$-di-Z-L-Lys-($N^\epsilon$-Z)-L-Lys-cetylamide melting at 147–152°; $[\alpha]_D^{21}=6.3°$ (c.=2.0 dimethylforamide).

H-L-Lys-L-Lys-cetylamide.3HCl: 28 g. of $N^\alpha,N^\gamma$-di-Z-L-Lys-($N^\epsilon$-Z)-L-Lys-cetylamide was decarbobenzoxylated by treatment with 50 ml. of 33% hydrogen bromide in glacial acetic acid for 2 hours. After precipitation with ether and distillation with 50 ml. of methanol, the residue was dissolved in a minimum of water and added to 80 g. of Amberlite IRA 410. It was then eluted with water, filtered through charcoal, treated with 30 ml. of 3 N hydrochloric acid and concentrated to 40 ml. at 50° and 60 mm./Hg. After precipitation with acetone, it was filtered with suction, dried over phosphorus pentoxide, taken up in hot ethanol, filtered through charcoal and precipitated via the slow addition of acetone, yielding 6.3 g. of H-L-Lys-L-Lys-cetylamide.3HCl, melting at 230–250° (dec.); $[\alpha]_D^{22}=+6.6°$ (c.=2.0 in methanol).

Example 13

$N^\alpha$ - Z - ($N^\epsilon$ - phthaloyl)-L-Lys-($N^\epsilon$-phthaloyl)-L-Lys-$OC_2H_5$: 10.5 g. (31 mmole) of $N^\epsilon$-phthaloyl-L-Lys-$OC_2H_5$·HCl was dissolved in 70 ml. of dimethylformamide, treated with 4.4 ml. of triethylamine and filtered. The filtrate was at once added to a solution of 12.6 g. (31 mmoles) of $N^\alpha$-Z-($N^\epsilon$phthaloyl)-L-Lys-OH in 150 ml. of absolute tetrahydrofuran, and then 6.4 g. (31 mmoles) of dicyclohexylcarbodiimide was added to the mixture. After being permitted to stand for 16 hours at 2–4°, the dicyclohexylurea formed was filtered off and the filtrate evaporated in vacuo. The residue was taken up in ethyl acetate and 1 N hydrochloric acid, filtered free of further urea, washed with 1 N hydrochloric acid, water, 10% sodium bicarbonate saturated sodium chloride solution, dried over sodium sulfate and evaporated in vacuo yielding $N^\alpha$ - Z - ($N^\epsilon$-phthaloyl)-L-Lys-($N^\epsilon$-phthaloyl)-L-Lys-$OC_2H_5$ which, upon recrystallization from ethyl acetate/petroleum ether, melted at 116–121°; $[\alpha]_D^{21} = -11.8°$ (c.=0.5 in ethanol).

H - ($N^\epsilon$ - phthaloyl) - L - Lys-($N^\epsilon$-phthaloyl)-L-Lys-$OC_2H_5$·HBr: The $N^\alpha$-carbobenzoxy group was split off from the above described protected dipeptide ester by treatment with hydrogen bromide/glacial acetic acid according to the method already described above, yielding H - ($N^\epsilon$ - phthaloyl) - L - Lys-($N^\epsilon$-phthaloyl)-L-Lys-$OC_2H_5$·HBr which upon recrystallization from chloroform and a little ethanol/ether melted at 230–235°.

$N^\alpha$ - Oleoyl - ($N^\epsilon$ - phthaloyl) - L - Lys-($N^\epsilon$-phthaloyl)-L-Lys-$OC_2H_5$: 12.9 g. (20 mmoles) of the above-obtained hydrobromide was liberated in 35 ml. of chloroform with 3 ml. of triethylamine, then treated with 100 ml. of tetrahydrofuran at −20°, filtered and treated with a further 3 ml. of triethylamine. Then, with good stirring under a nitrogen atmosphere and at −30°, 5.6 g. (18.6 mmoles) of oleoyl chloride was added thereto dropwise, the resulting mixture then stirred for a further ½ hour at 0° and then evaporated in vacuo. The residue was taken up in warm ethyl acetate/1 N hydrochloric acid, separated in a preheated separating funnel and rapidly washed with warm water and concentrated sodium chloride solution, dried and concentrated in vacuo. The residue was then crystallized from ethyl acetate/petroleum ether and ethanol/water yielding 12 g. of $N^\alpha$-oleoyl-($N^\epsilon$-phthaloyl)-L-Lys-($N^\epsilon$-phthaloyl)-L-Lys-$OC_2H_5$ melting at 118–125°; $[\alpha]_D^{23} = -9.7°$ (1.0 in ethanol).

$N^\alpha$ - oleoyl - L - Lys-L-Lys-$OC_2H_5$·HCl: In order to split off the phthaloyl protecting groups 9.7 g. (11.7 mmoles) of the above obtained product was dissolved in 100 ml. of ethanol and following the addition under a nitrogen atmosphere of 3.5 ml. of 6.72 N hydrazine hydrate, heated for one hour under reflux. After cooling, it was treated with 8.0 ml. of 3.2 N hydrogen chloride in ethanol, held at room temperature overnight and with suction filtered free of phthaloyl hydrazide. The filtrate was concentrated in vacuo and after further filtration of phthaloyl hydrazide, twice recrystallized from ethanol/ether, yielding 3.3 g. of $N^\alpha$ - oleoyl - L - Lys - L - Lys-$OC_2H_5$·2HCl which decomposed above 230° without melting; $[\alpha]_D^{23} = -17.7°$ (c.=1.0 in ethanol).

The starting materials used in the foregoing examples were prepared as follows:

$N^\alpha$-Palm-($N^\delta$-Z)-L-Orn-OH (cf. Example 4f): A solution of 26.6 g. (0.1 mole) of $N^\delta$-Z-L-Orn-OH [Biochem. J., 46, 582 (1950)] in 150 ml. of 1.5 N potassium hydroxide and 100 ml. of tetrahydrofuran was treated dropwise at 2–5° with 30 g. (0.11 mole) of palmitoyl chloride. Following the addition, the mixture was stirred for a further 40 minutes with occasional addition of 2 N potassium hydroxide in order to maintain the medium alkaline. It was then acidified (Congo red) with hydrochloric acid and the tetrahydrofuran evaporated in vacuo. To the residue there was added 500 ml. of ethyl acetate and a small amount of concentrated hydrochloric acid. The resulting aqueous phase was separated off and the remainder, with the addition of a small amount of methanol, washed with 4 N hydrochloric acid, water and concentrated sodium chloride solution, dried over sodium sulfate and concentrated in vacuo. Recrystallization of the residue from methanol/water (10:1) yielded $N^\alpha$-Palm-($N^\delta$-Z)-L-Orn-OH melting at 91–96°; $[\alpha]_D^{20} = +.8°$ (c.=1.0 in ethanol).

The above described procedure was used to prepare the $N^\alpha$-acylated $N^\omega$-Z-amino acids listed in the following table:

| Cf. Example | | M.P. | Cryst. from— |
|---|---|---|---|
| 1 | $N^\alpha$-Palm-($N^\epsilon$-Z)-L-Lys-OH | 101–102° | (Hydrogen Chloride/water). |
| 4c | $N^\alpha$-Palm-($N^\epsilon$-Z)-D-Lys-OH | 101–102° | Do. |
| 4d | $N^\alpha$-Palm-($N^\epsilon$-Z)DL-Lys-OH | 134–135° | (Ethyl Acetate/Petroleum Ether). |
| 4e | $N^\alpha$-Stearoyl-($N^\epsilon$-Z)-L-Lys-OH | 95–97° | (Ethyl Acetate/Petroleum Ether). |
| 4h | $N^\alpha$-Lauroyl-($N^\epsilon$-Z)-L-Lys-OH | 102–104° | (Ether/Petroleum Ether). |
| 4i | $N^\alpha$-Palm-($N^\gamma$-Z)-L-Dab-OH | 94–96° | (Methanol/water). |
| 4m | $N^\alpha$-Capryl-($N^\epsilon$-Z)-L-Lys-OH | 102–106° | (Ethyl Acetate/Petroleum Ether). |

The amino acid esters were prepared either according to the standard procedure of Curtius and Goebel, J. prakt. Chemie [2], 37, 150 (1888), with alcohol/hydrogen chloride or by means of alcohol and thionyl chloride according to the procedure of Brenner and Huber, Helv. Chimica Acta, 36, 1109 (1953).

H-($N^\epsilon$-Palm)-L-Lys-$OCH_3$ (cf. Example 4k): 24 g. of H-L-Lys-OH·HCl was dissolved in 1500 ml. of water and heated under reflux for 2 hours with 40 g. of basic copper carbonate. It was then filtered and treated at 0° with 40 g. of palmitoyl chloride and sufficient 2 N sodium hydroxide in order to maintain the reaction mixture basic. After 2 hours, the precipitated copper complex was filtered off, washed with water, acetone and ether and dried. The powder was then suspended in 500 ml. of methanol and 50 ml. of water, acidified with concentrated hydrochloric acid and treated for ½ hour at 60° with hydrogen sulphide. The copper sulphide was then filtered off and the filtrate adjusted to pH 7 with sodium hydroxide. After standing for 4 hours at room temperature, the mixture was filtered and the residue crystallized from glacial acetic acid/ether yielding H-($N^\epsilon$-Palm)-L-Lys-OH melting at 240°.

30 ml. of anhydrous methanol was treated at −10° with 2.7 ml. of thionyl chloride. 14 g. of H-($N^\epsilon$-Palm)-L-Lys-OH was then added to the mixture. After 3 hours the clear solution was evaporated in vacuo at 45°, the residue dissolved in methanol and crystallized by the addition of ether. The crystals were filtered off with suction, washed with ether and dried, yielding H-($N^\epsilon$-Palm)-L-Lys-$OCH_3$·HCl melting at 142–143°.

H-($N^\gamma$-Palm)-L-Dab-$OCH_3$ (cf. Example 8): 41 g. of H-L-Dab-OH·HCl and 35 g. of basic copper carbonate in 300 ml. of water were heated with stirring for 2½ hours under reflux. Following filtration with suction, the filtrate was treated with 60 g. of sodium bicarbonate and, while stirring at 20°, treated dropwise with a solution of 73 g. of palmitoyl chloride in 200 ml. of acetone. The mixture was then stirred for 16 hours at 20°, the copper complex filtered off with suction, washed with a large amount of water and acetone, dissolved in 200 ml. of water and 500 ml. of methanol with the addition of concentrated hydrochloric acid, and treated with hydrogen sulphide until no more copper sulphide separated out.

The copper sulphide was then filtered off, washed with methanol, the filtrate concentrated in vacuo at 30° to a volume of 300 ml., adjusted with triethylamine to a pH of 7 and simultaneously diluted with 500 ml. of methanol. After 5 hours, the product was filtered off with suction, washed with methanol and dried, yielding H-($N^\gamma$-Palm)-L-Dab-OH melting at 208–210° (dec.).

80 ml. of methanol and 7.3 ml. of thionyl chloride were mixed at —10°, treated with 36 g. of H-($N^\gamma$-Palm)-L-Dab-OH and warmed under reflux at 50° for 6 hours with the exclusion of moisture. The solution was then concentrated in vacuo at 50° and recrystallized from methanol/ether yielding H-($N^\gamma$-Palm)-L-Dab-$OCH_3$.HCl melting at 144–146°.

$N^\alpha$-formyl-($N^\gamma$-Z)-D-Dab-OH (cf. Example 8): Cf. Helv. Chim. Acta, 43, 279 (1959).

$N^\alpha$-Z-($N^\gamma$-Z)-D-Dab-OH (cf. Example 9): Cf. Chem. Listy, 47, 427 (1953).

$N^\alpha$-Z-($N^\gamma$-Z)-D-Dab-($N^\gamma$-Z)-D-Dab-$OCH_3$ (cf. Example 9): From H-($N^\gamma$-Z)-D-Dab-$OCH_3$ and $N^\alpha$-Z-($N^\gamma$-Z)-D-Dab-OH by use of carbodiimide according to the process of Example 1, $N^\alpha$-Z-($N^\gamma$-Z)-D-Dab-($N^\gamma$-Z)-D-Dab-$OCH_3$ melting at 122–124° was obtained. The corresponding dipeptide acid was obtained by saponification using the calculated amount of alkali. Said acid melted at 163–165°.

$N^\alpha$-formyl-($N^\gamma$-Z)-L-Dab-($N^\gamma$-Z)-D-Dab-$OCH_3$ (cf. Example 10): This was prepared from the components in accordance with the procedure in Example 1; M.P. 138–141°.

$N^\alpha$-formyl-($N^\gamma$-Z)-L-Dab-($N^\gamma$-Z)-D-Dab-$NHNH_2$ (cf. Example 10): This was prepared from the corresponding ester using hydrazine hydrate in accordance with the procedure set forth in Example 3; M.P. 196–200°.

H-($N^\gamma$-Z)-D-Dab-($N^\gamma$-Palm)-L-Dab-$OCH_3$ (cf. Example 10): This was prepared from $N^\alpha$-formyl-($N^\gamma$-Z)-D-Dab-($N^\gamma$-Palm)-L-Dab-$OCH_3$ and methanolic hydrochloric acid at room temperature.

H-($N^\epsilon$-phthaloyl)-L-Lys-$OCH_3$.HCl (cf. Example 11): 72 g. of H-($N^\epsilon$-phthaloyl)-L-Lys-OH (Rec. Trav. Chim. Pays-Bas, 79, 688 [1960]) was covered with 1500 ml. of hydrogen chloride/ethanol and refluxed at 60° for 72 hours with the exclusion of moisture. It was then concentrated and precipitated with ether. The precipitate was recrystallized from ethanol/ether, yielding the hydrochloride of H-($N^\epsilon$-phthaloyl)-L-Lys-$OC_2H_5$ which melted at 175–177°, $[\alpha]_D^{22}=+12.3°$ (c.=2 in water).

$N^\alpha$-(10-undecenoyl)-($N^\epsilon$-phthaloyl)-L-Lys-OH (cf. Example 11): For the preparation of $N^\alpha$-(10-undecenoyl)-($N^\epsilon$-phthaloyl)-L-Lys-OH, 3.3 g. of the corresponding ester hydrochloride was dissolved in 30 ml. of dimethylformamide, 1.5 ml. of triethylamine added thereto and the mixture with suction filtered free of the so-formed triethylamine hydrochloride. Then 1.9 g. of 10-undecenic acid was added thereto, the resulting mixture thoroughly cooled and treated with a solution of 2.2 g. of dicyclohexylcarbodiimide and 10 ml. of dimethylformamide. After 20 hours the urea formed was filtered off and the filtrate precipitated with ice/sodium chloride solution. The precipitate was then taken up in ethyl acetate, washed with sodium bicarbonate, hydrochloric acid and water and dried. Recrystallization from ethyl acetate/petroleum ether yielded purified $N^\alpha$-(10-undecenoyl)-($N^\epsilon$-phthaloyl)-L-Lys-$OC_2H_5$. 21 g. of this latter substance was dissolved in 250 ml. of acetone. 50 ml. of water and 25 ml. of concentrated hydrochloric acid were added thereto, and the resulting mixture boiled under reflux for 3½ hours. It was then concentrated in vacuo at 40°, extracted 3 times with ethyl acetate and recrystallized from ethyl acetate/petroleum ether yielding $N^\alpha$-(10-undecenoyl)-($N^\epsilon$-phthaloyl)-L-Lys-OH melting at 114–116°.

$N^\alpha$-Z-($N^\epsilon$-phthaloyl)-L-Lys-OH (cf. Example 13): 15 g. (0.048 mole) of $N^\epsilon$-phthaloyl-L-Lys-OH.HCl was dissolved in 150 ml. of water and 100 ml. of acetone and then stirred at 4–5° together with 6 g. of magnesium oxide, following which during the course of 45 minutes 9.0 g. (0.053 mole) of carbobenzoxy chloride in 30 ml. of acetone was added to the mixture dropwise. After stirring for a further 4 hours at 5–10° the mixture was acidified, concentrated in vacuo to ½ its volume and extracted with ethyl acetate. This was then thoroughly extracted with 5% potassium bicarbonate and the extracts after acidification were further extracted with ethyl acetate. Drying and concentration in vacuo yielded 14.5 g. of $N^\alpha$-Z-($N^\epsilon$-phthaloyl)-L-Lys-OH in the form of a glasslike mass which did not crystallize.

*Example 14*

3 flasks were each filled with 100 ml. of freshly strained grape juice. One flask of the group was kept as the control. To a second flask there was introduced sufficient $N^\alpha$-Palm-L-Lys-L-lysine ethyl ester dihydrochloride to bring about a final concentration of 0.001% and a sufficient amount of the same substance was added to the third flask to bring about a final concentration of 0.01%. The flavor and odor of the grape juice was unchanged by these additions. The flasks were closed with a plug of cotton wool and allowed to stand at room temperature. While the content of the first flask strongly fermented after 4 days, fermentation first began in the 0.001% addition flask after about 6 days and the flask with the 0.01% addition showed no appearance of fermentation of any sort after 14 days and was no different in flavor and odor from freshly strained grape juice.

Analogous results were obtained with apple and carrot juice.

*Example 15*

3 portions of (80 g. each of) minced meat were wrapped in sterile gauze. In the case of the first portion, the gauze was moistened with sterile water. In the case of the second portion, the gauze was moistened with a 0.1% solution of $N^\alpha$-Palm-L-Lys-L-lysine ethyl ester dihydrochloride, and in the case of the third portion, the gauze was moistened with a 1% solution of the aforementioned substance (each of the solutions was prepared with sterile distilled water). While the control portion was already unsightly after 2 days at room temperature and possessed an odor of tainted meat, the other 2 remaining portions retained their original color for 2 further days at room temperature, and the odor of tainted meat was practically absent.

In a similar way pork slices and cut ham were tested, but these were also in addition packed in plastic foil in order to avoid drying out. A favorable effect of the additive was also observed in these cases.

*Example 16*

Six slices of black bread (Westphalian rye bread or Rhine whole-meal bread or the like) were laid out in glass dishes. Two slices were sprayed with 1 g. of tap water, two slices with tap water containing an addition of 0.1% $N^\alpha$-Palm-L-Lys-L-lysine ethyl ester dihydrochloride, and the two remaining slices with tap water containing an addition of 1% $N^\alpha$-Palm-L-Lys-L-lysine ethyl ester dihydrochloride. The slices were packed together with the glass dishes in polyethylene bags (in order to avoid drying out) and kept at room temperature. After 10 days, the sample which had been sprayed with tap water was completely deteriorated while the slices which had been treated with the 0.1% solution showed only slight local cultures of mold and the slices of bread which had been treated with the 1% solution showed no preceptible change at all.

*Example 17*

28 oranges were each punctured ten times with a needle in order to facilitate the penetration of microorganisms.

Subsequently 7 oranges were each immersed 1 minute in one of the three following solutions:

(1) Water + 1% polyoxyethylene sorbitol monooleate.
(2) Water + 1% polyoxyethylene sorbitol monooleate + 0.1% N$^\alpha$-Palm-L-Lys-L-lysine ethyl ester dihydrochloride.
(3) Water + 1% polyoxyethylene sorbitol monooleate + 1% N$^\alpha$-Palm-L-Lys-L-lysine ethyl ester dihydrochloride.

After draining, the 21 oranges were evenly sprayed with a suspension of spores which originated from an orange which had become moldy. The oranges were then wrapped up in groups in paper which had been moistened with water. The remaining 7 oranges were treated with solution 1 above, sprayed and wrapped up in paper which in place of water had been moistened with solution 3 above. The fruits were then laid out at room temperature and prevented from drying out by covering with plastic foil. The results are given in the following table.

| Days after commencement of the experiment | Group I — Fruit treated with solution 1; paper treated with water | Group II — Fruit treated with solution 2; paper treated with water | Group III — Fruit treated with solution 3; paper treated with water | Group IV — Fruit treated with solution 1; paper treated with solution 3 |
|---|---|---|---|---|
| 0 | | | | |
| 3 | 4+ | 1+ | 2++ | |
| 4 | 4++; 2+ | 2++; 2+ | 3++; 2+ | 1+ |
| 5 | 6++; 1+ | 3++; 2+ | 3++; 2+ | 2+ |
| 6 | 7++ | 4++; 3+ | 5++; 2+ | 1++; 1+ |
| 10 | 7++ | 7++ | 7++ | 3++; 1+ |

The numbers indicate the number of oranges on which mold attack could be observed, and the + signs indicate the degree of attack as follows:
+ = Slight mould.
++ = A large amount of mould.

Example 18

50 ml. flasks, each containing 19 ml. of white grape juice, were each treated with 1 ml. of a concentrated solution of a preservative indicated in the table below in a quantity sufficient so that the end concentration shown in the table below was obtained. In order to facilitate fermentation, 0.1 ml. of a 10% suspension of a baker's yeast in water (that is 10 mg. of yeast per batch) was added to each of the flasks. The amount of fermentation was evaluated after storage at room temperature (about 20°) after the first, second, third and fourth days.

| Preservative Agent | Days | End concentration of the preservative agent in percent | | | |
|---|---|---|---|---|---|
| | | 0.05 | 0.01 | 0.005 | 0.001 |
| N$^\alpha$-Palm-L-Lys-L-Lys-amide/dihydrochloride. | 1 | − | − | + | + |
| | 2 | − | − | + | ++ |
| | 3 | − | + | ++ | ++ |
| | 4 | − | +++ | +++ | +++ |
| N$^\alpha$-Palm-L-Orn-L-arginine methyl ester dihydrochloride. | 1 | − | − | + | + |
| | 2 | − | + | ++ | ++ |
| | 3 | − | ++ | ++ | +++ |
| | 4 | − | +++ | +++ | +++ |
| N$^\alpha$-Palm-L-Orn-L-ornithine methyl/ester dihydrochloride. | 1 | − | − | + | + |
| | 2 | − | + | ++ | ++ |
| | 3 | − | + | ++ | +++ |
| | 4 | − | ++ | ++ | +++ |
| N$^\alpha$-Palm-L-Lys-L-Lysine ethyl/ester dihydrochloride. | 1 | − | − | + | + |
| | 2 | − | − | + | + |
| | 3 | − | − | ++ | ++ |
| | 4 | − | + | ++ | ++ |
| L-Lys-L-Lys-hexadecylamide trihydrochloride. | 1 | − | − | + | + |
| | 2 | − | − | + | ++ |
| | 3 | − | + | + | +++ |
| | 4 | − | + | ++ | +++ |
| N$^\alpha$-Palm-L-Lys-L-leucine methyl/ester hydrochloride. | 1 | − | − | − | − |
| | 2 | − | − | − | − |
| | 3 | − | − | + | + |
| | 4 | − | − | + | ++ |

| | Days | 1st Batch | 2d Batch |
|---|---|---|---|
| 2 Control batches with addition of 1 ml. of distilled water and 0.1 ml. of yeast suspension. | 1 | + | + |
| | 2 | ++ | ++ |
| | 3 | ++ | ++ |
| | 4 | +++ | +++ |

Legend: − = no fermentation; + = weak fermentation; ++ = strong fermentation; +++ = very strong fermentation.

Example 19

50 ml. flasks each containing 19 ml. of freshly strained orange juice were each treated with 1 ml. of a sufficiently concentrated solution of a preservative indicated in the table below, so that the end concentration indicated in the table was obtained. The flasks were then stored at room temperature (about 20°) and the mold formation evaluated after the third, fifth, seventh and ninth days.

| Preservative Agent | Days | End Concentration of Preservative in Percent | | | |
|---|---|---|---|---|---|
| | | 0.05 | 0.01 | 0.005 | 0.001 |
| N$^\alpha$-Palm-L-Lys-L-Lys-amide dihydrochloride. | 3 | − | − | − | − |
| | 5 | − | − | − | − |
| | 7 | − | − | − | + |
| | 9 | − | + | ++ | +++ |
| N$^\alpha$-Palm-L-Orn-L-arginine methyl ester dihydrochloride. | 3 | − | − | + | + |
| | 5 | − | − | + | ++ |
| | 7 | − | + | ++ | +++ |
| | 9 | + | ++ | +++ | +++ |
| N$^\alpha$-Palm-L-Orn-L-ornithine methyl ester dihydrochloride. | 3 | − | − | − | + |
| | 5 | − | − | + | ++ |
| | 7 | − | + | ++ | +++ |
| | 9 | + | + | ++ | +++ |
| N$^\alpha$-Palm-L-Lys-L-Lysine ethyl/ester dihydrochloride. | 3 | − | − | − | − |
| | 5 | − | − | − | − |
| | 7 | − | − | − | − |
| | 9 | − | − | + | ++ |
| L-Lys-L-Lys-hexadecylamide trihydrochloride. | 3 | − | − | + | + |
| | 5 | − | − | + | + |
| | 7 | − | + | + | ++ |
| | 9 | − | ++ | +++ | +++ |
| N$^\alpha$-Palm-L-Lys-L-leucine methyl ester hydrochloride. | 3 | − | + | + | + |
| | 5 | − | + | ++ | ++ |
| | 7 | − | + | ++ | +++ |
| | 9 | + | ++ | +++ | +++ |

| | Days | 1st Batch | 2d Batch |
|---|---|---|---|
| 2 control batches with addition of 1 ml. of distilled water. | 3 | − | + |
| | 5 | + | ++ |
| | 7 | ++ | ++ |
| | 9 | +++ | +++ |

Legend:
− = No mold formation.
+ = Small amount of mold (up to about 10% of the surface covered).
++ = Large amount of mold formation (about 50% of the surface covered).
+++ = Very large amount of mold formation (100% of the surface covered).

Example 20

50 ml. of vinegar and 100 ml. of peanut oil, together with 750 mg. of $N^\alpha$-Palm-L-Lys-L-lysine ethyl ester dihydrochloride, as emulsifying agent, were emulsified for one minute at a speed of 10,000 r.p.m. A control experiment, where the emulsifying agent was omitted, was run simultaneously. Whereas the control mixture separated into two layers after about one hour, the mixture containing the emulsifying agent remained as an emulsion for more than 24 hours. The emulsifying power of the tested agent for water-in-oil emulsion starts at about 0.5% addition, a concentration far below that used for preservative action.

We claim:

1. A compound selected from the group consisting of compounds of the formula:

$$H_2N-R-CO-NH-R-CO\{NH-R-CO-\}_{n_2}\{NH-R-CO\}_{n_1}-X$$

and acid addition salts thereof; wherein $n_1$ and $n_2$ are each a whole integer from 0 to 1; X is selected from the group consisting of hydroxy, alkoxy, amino, alkylamino, dialkylamino, and hydrazino; each R is the residue of an α-amino acid devoid of its α-amino and carboxyl group, at least one R being the residue of a diaminocarboxylic acid; and the molecule contains at least one long-chain aliphatic group selected from the group consisting of a long-chain aliphatic acyl substituent on a free amino group and a long-chain aliphatic substituent comprehended by X when X is selected from the group consisting of alkylamino and dialkylamino.

2. A compound as in claim 1 wherein $n_1$ and $n_2$ are each 0.

3. A compound as in claim 1 wherein at least one long-chain aliphatic group contains from 10 to 20 carbon atoms.

4. A compound selected from the group consisting of ($N^\alpha$-palmitoyl-L-lysyl)-L-lysine, alkyl esters thereof, amides thereof and hydrazides thereof, and acid addition salts of each.

5. A compound selected from the group consisting of L-lysyl-($N^\epsilon$-palmitoyl-L-lysine), alkyl esters thereof, amides thereof and hydrazides thereof, and acid addition salts of each.

6. A compound selected from the group consisting of [$N^\alpha$ - palmitoyl-L-(α,γ-diaminobutyryl)]-L-(α,γ-diaminobutyric acid), alkyl esters thereof, amides thereof and hydrazides thereof, and acid addition salts of each.

7. A compound selected from the group consisting of L - (α,γ - diaminobutyryl)-L-[$N^\gamma$-palmitoyl-L-(α,γ-diaminobutyric acid)], alkyl esters thereof, amides thereof and hydrazides thereof, and acid addition salts of each.

8. A compound selected from the group consisting of ($N^\alpha$-palmitoyl-L-ornithyl)-L-arginine, alkyl esters thereof, amides thereof and hydrazides thereof, and acid addition salts of each.

9. A compound selected from the group consisting of ($N^\alpha$-palmitoyl-L-arginyl)-L-ornithine, alkyl esters thereof, amides thereof and hydrazides thereof, and acid addition salts of each.

10. A compound selected from the group consisting of ($N^\alpha$-palmitoyl-L-arginyl)-L-arginine, alkyl ester thereof, amides thereof and hydrazides thereof, and acid addition salts of each.

11. A compound of the formula $$H_2N-\underset{\underset{NH_2}{|}}{\underset{|}{C}H}-COY$$
$$\phantom{H_2N-}R_1$$

wherein $R_1$ is selected from the group consisting of lower alkylene and $-(CH_2)_3-NH-C(=NH)-$; Y is selected from the group consisting of hydroxy and alkoxy; one of the two amino groups is substituted by a long-chain acyl group and the other amino group is selected from the group consisting of primary amino and amino protected with a removable protecting group.

12. A compound of the formula $$\underset{R_1}{\overset{H}{\diagdown}}N-\underset{\underset{H-N-R_2}{|}}{\underset{|}{C}H}-COY$$
$$\phantom{N-}R$$

wherein R is selected from the group consisting of lower alkylene and $-(CH_2)_3-NH-C(=NH)-$; Y is selected from the group consisting of hydroxy and alkoxy; one of $R_1$ and $R_2$ is a long-chain acyl group and the other is hydrogen.

13. ($N^\alpha$-palmitoyl-L-lysyl)-L-lysine ethyl ester dihydrochloride.

14. ($N^\alpha$-palmitoyl-L-lysyl)-L-lysine amide dihydrochloride.

15. ($N^\alpha$-palmitoyl-L-ornithyl)-L-arginine methyl ester dihydrochloride.

References Cited by the Examiner

UNITED STATES PATENTS

| | | | |
|---|---|---|---|
| 2,592,454 | 4/1952 | Mowat et al. | 260—112 |
| 2,668,115 | 2/1954 | Wolf | 99—154 |
| 2,668,116 | 2/1954 | Wolf | 99—154 |
| 2,843,525 | 7/1958 | Robinson et al. | 260—112.5 |
| 2,850,491 | 9/1958 | Brenner | 260—112 |

FOREIGN PATENTS

Ad. 71,405    7/1959    France.

OTHER REFERENCES

Boissonnas et al., Chem. Abs. volume 55, No. 14, p. 13325–26.

Bondi et al., Biochemische Zeitschrift, volume 23, 1910, pp. 499–509.

LEWIS GOTTS, *Primary Examiner.*

HYMAN LORD, *Examiner.*

P. A. STITH, *Assistant Examiner.*

UNITED STATES PATENT OFFICE
CERTIFICATE OF CORRECTION

Patent No. 3,265,682                              August 9, 1966

Urs Gloor et al.

It is hereby certified that error appears in the above numbered patent requiring correction and that the said Letters Patent should read as corrected below.

Column 2, line 18, for "undecanoyl" read -- undecenoyl --; line 33, for "diaminobutyryl-L" read -- diaminobutyryl)]-L --; column 5, line 29, for "benzyloxycarbonyl" read -- benzyloxycarbonyl-L- --; column 5, line 30, for "benzyloyl" read -- benzyloxy --; line 52, for "polmitoyl" read -- palmitoyl --; column 6, line 21, for "$N^a$" read -- [$N^a$ --; line 23, for "orginyl" read -- arginyl --; column 8, line 8, for "N-(N" read -- H-(N --; line 39, for "N-Palm" read -- $N^a$-Palm --; column 14, line 59, for "=6.3°" read -- =-6.3° --; column 15, line 44, for "-20°" read -- 20° --; column 16, line 17, for "+-.8°" read -- +4.8° --; column 19, line 67, second Table, sixth column, line 15, for "+" read -- ++ --.

Signed and sealed this 22nd day of August 1967.

(SEAL)
Attest:

ERNEST W. SWIDER                                    EDWARD J. BRENNER
Attesting Officer                                    Commissioner of Patents